ശ
2,799,616
NEMATOCIDE

William K. Johnson, Dayton, Ohio, assignor to Monsanto Chemical Company, St. Louis, Mo., a corporation of Delaware No Drawing. Application April 5, 1955,
Serial No. 499,522

4 Claims. (Cl. 167—33)

This invention relates to aryl-1,2-ethanediol cyclic carbonates, new compounds which are highly valuable as nematocides.

Nematocides which have been known previously have contained such toxic elements as chlorine and sulfur. The present invention provides new and effective nematocides which contain only the common and non-toxic elements, carbon, hydrogen and oxygen.

It has been found that the present compounds may be readily prepared by the reaction of a dialkyl carbonate with an aryl-1,2-ethanediol in the presence of an alkaline catalyst, as represented by the following equation:

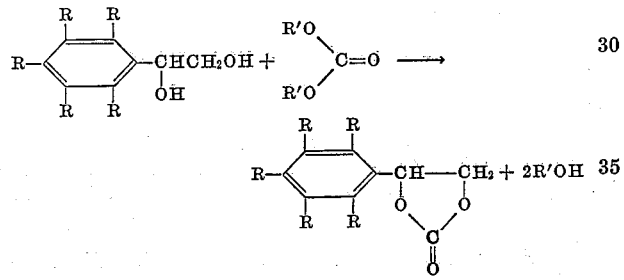

where R is selected from the class consisting of hydrogen and alkyl radicals of from 1 to 6 carbon atoms and R' is a lower alkyl radical.

The diols which may be used in preparing the present compounds are aryl-1,2-ethanediols such as phenyl-1,2-ethanediol, o-tolyl-1,2-ethanediol, m-tolyl-1,2-ethanediol, p-tolyl-1,2-ethanediol, 2,3-xylyl-1,2-ethanediol, 3,4-xylyl-1,2-ethanediol, p-ethylphenyl-1,2-ethanediol, o-isopropylphenyl-1,2-ethanediol, o-n-butylphenyl-1,2-ethanediol, m-hexylphenyl-1,2-ethanediol, 2-methyl-4-isopropylphenyl-1,2-ethanediol, etc. The aryl-1,2-ethanediols of this type are readily prepared, for example, by catalytic dihydroxylation of the corresponding vinylaromatic hydrocarbons, e. g., as described by Milas and Sussman (Journal Amer. Chemical Soc. 1937, 59, 2345). Dialkyl carbonates may be prepared by the reaction of phosgene with alkyl alcohols. Examples of suitable dialkyl carbonates for use in the method of the present invention are dimethyl carbonate, diethyl carbonate, diisopropyl carbonate, di-n-butyl carbonate, dihexyl carbonate, etc.

In preparing the present compounds, the diol and the carbonate are preferably contacted in approximately equimolecular amounts, though an excess of either of the reactants may be used if desired. The alkaline catalyst may be present in amounts of, e. g., from 0.01 to 0.1 percent by weight of the combined reactants. As alkaline catalysts may be used alkali metal or alkaline earth metal hydroxides, carbonates, bicarbonates, etc. The reaction proceeds readily and without difficulty in the absence of a solvent; solvents or diluents, such as benzene, ethylene dichloride, dioxane, chloroform, etc., may be used if desired. The reaction temperature may range from room temperature up to the reflux temperature of the mixture; generally, it will be preferred to operate at temperatures sufficiently high to facilitate the removal of the alcohol which is the by-product of this reaction. If desired, subatmospheric pressures could be used, e. g., to facilitate the removal of the alcohol, i. e., by reduction of its boiling point. Reaction is complete when the theoretical amount of the alcohol has been evolved. The product may be isolated by crystallization from a suitable solvent, e. g., carbon tetrachloride or chloroform.

The preparation of the present compounds is further illustrated by the following example:

Example 1

Into a flask provided with a take-off condenser were charged 138 g. of phenyl-1,2-ethanediol, 118 g. of diethyl carbonate, and 0.6 g. of potassium carbonate. On raising the temperature of the flask to 90–110° C., ethanol was evolved and removed via the condenser. When the theoretical weight of ethanol had been evolved, the reaction mixture in the flask was poured into 300 ml. of carbon tetrachloride. Crystals began to separate immediately; after standing several days, 121.5 g. (dry weight) of the product phenyl-1,2-ethanediol cyclic carbonate could be filtered from the solution, and a further 20 g. of product were recovered by concentration of the filtrate, giving better than 85 percent of theoretical yield. The cyclic carbonate melted at 56–57° C., and analyzed as follows:

|  | Found | Calculated for $C_9H_8O_3$ |
|---|---|---|
| Percent C | 65.77 | 65.86 |
| Percent H | 5.28 | 4.91 |

Similarly, by reaction of o-methylphenyl-1,2-ethanediol with diethyl carbonate, there is prepared o-methylphenyl-1,2-ethanediol cyclic carbonate; p-isopropylphenyl-1,2-ethanediol cyclic carbonate may be prepared by the reaction of p-isopropylphenyl-1,2-ethanediol and dimethyl carbonate, etc.

The present aryl-1,2-ethanediol cyclic carbonates are stable, generally solid materials, which are useful as chemical intermediates, and which are effective biological toxicants and are particularly active as nematocides.

Example 2

The product of Example 1 was evaluated as follows:

It is known that nematodes suspended in water will flex their bodies at a more or less constant rate, and that the rate and extent of flexing is an index of the vitality of the nematodes. The effect of a nematocide can be estimated by counting the rate of this flexing action.

To a Stender dish were added 2.5 mls. of an aqueous suspension containing approximately 250 live nematodes, of the species *Panagrellus redivivus*. An emulsion of phenyl-1,2-ethanediol cyclic carbonate was made up by dissolving one gram of the compound in a small amount of acetone, adding to this solution an emulsifying agent known to the trade as "Tween 20," and reputed to be a polyoxyalkylene sorbitan monolaurate, and adding water to make 50 ml., giving a 2 percent concentration of the carbonate. This emulsion was then added to the Stender dish in an amount to give an 0.1 percent concentration of the carbonate in the nematode suspension and the suspension was observed under a microscope. The motility of the nematodes, expressed as a percentage of the normal flexing rate of a control dispersion free of nematocide, was as shown below:

| Motility after— | Culture containing the carbonate | Control |
|---|---|---|
| 10 minutes | 10 | 100 |
| 20 minutes | 2 | 100 |
| 30 minutes | 1 | 100 |
| 60 minutes | 1 | 100 |
| 2 hours | 1 | 100 |
| 24 hours | 1 | 100 |

The present cyclic carbonates may be applied to soils to eliminate or control nematode activity, at rates of from 50 to 600 lbs. per acre. On average soils, rates of from 100 to 200 lbs. per acre, for example, may be effective.

The carbonates may be applied to soils as a solution, emulsion or dust. Since the compounds are solid and stable, they may be readily compounded with solid carriers, i. e., talc, bentonite, calcium carbonate, diatomaceous earth, etc., to form a dust which can be applied to soils either directly, or in admixture with fertilizers, insecticides, etc. As organic solutions or emulsions, the carbonates may be sprayed on the earth, i. e., by an irrigation machine, or injected into the soil.

In addition to use in soils, the present compounds may also be applied to other nematode environments, i. e., soil substitutes such as sand, greenhouse potting mixtures, etc.

The present aryl-1,2-ethanediol cyclic carbonates may also be used to destroy endoparasitic worms other than nematodes, e. g., the flukes, tapeworms and other parasites which frequent the environment of farm animals and fowls. The surface soils in such localities may be treated with the present carbonate to destroy eggs and larvae of such worms during the soil phase of their life cycle, and decrease or eliminate infection of animals and fowls.

What is claimed is:

1. The method of controlling nematodes which comprises exposing said nematodes to a toxic quantity of a nematocidal composition comprising in inert carrier and, as the essential effective ingredient, a cyclic carbonate of the structure

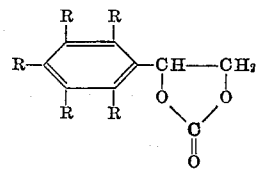

where R is selected from the class consisting of hydrogen and alkyl radicals of from 1 to 6 carbon atoms.

2. The method of treating nematode-infested soil which comprises dispersing in the soil a toxic quantity of a cyclic carbonate of the structure

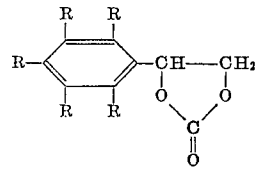

where R is selected from the class consisting of hydrogen and alkyl radicals of from 1 to 6 carbon atoms.

3. The method of controlling nematodes which comprises exposing said nematodes to a toxic quantity of a nematocidal composition comprising an inert carrier and, as the essential effective ingredient, phenyl-1,2-ethanediol cyclic carbonate.

4. The method of treating nematode-infested soil which comprises dispersing in the soil a toxic quantity of phenyl-1,2-ethanediol cyclic carbonate.

References Cited in the file of this patent

UNITED STATES PATENTS

| 1,995,291 | Carothers | Mar. 26, 1935 |
| 2,020,298 | Carothers et al. | Nov. 12, 1935 |
| 2,563,771 | Adelson | Aug. 7, 1951 |
| 2,662,899 | Bashour | Dec. 15, 1953 |

OTHER REFERENCES

Beilstein: Handbuch der Org. Chem., vol. XIX, p. 127 (1934).